O. TUFTS.
Changeable-Gage Truck.
No. { 2,403, 33,407. }
Patented Oct. 1, 1861.
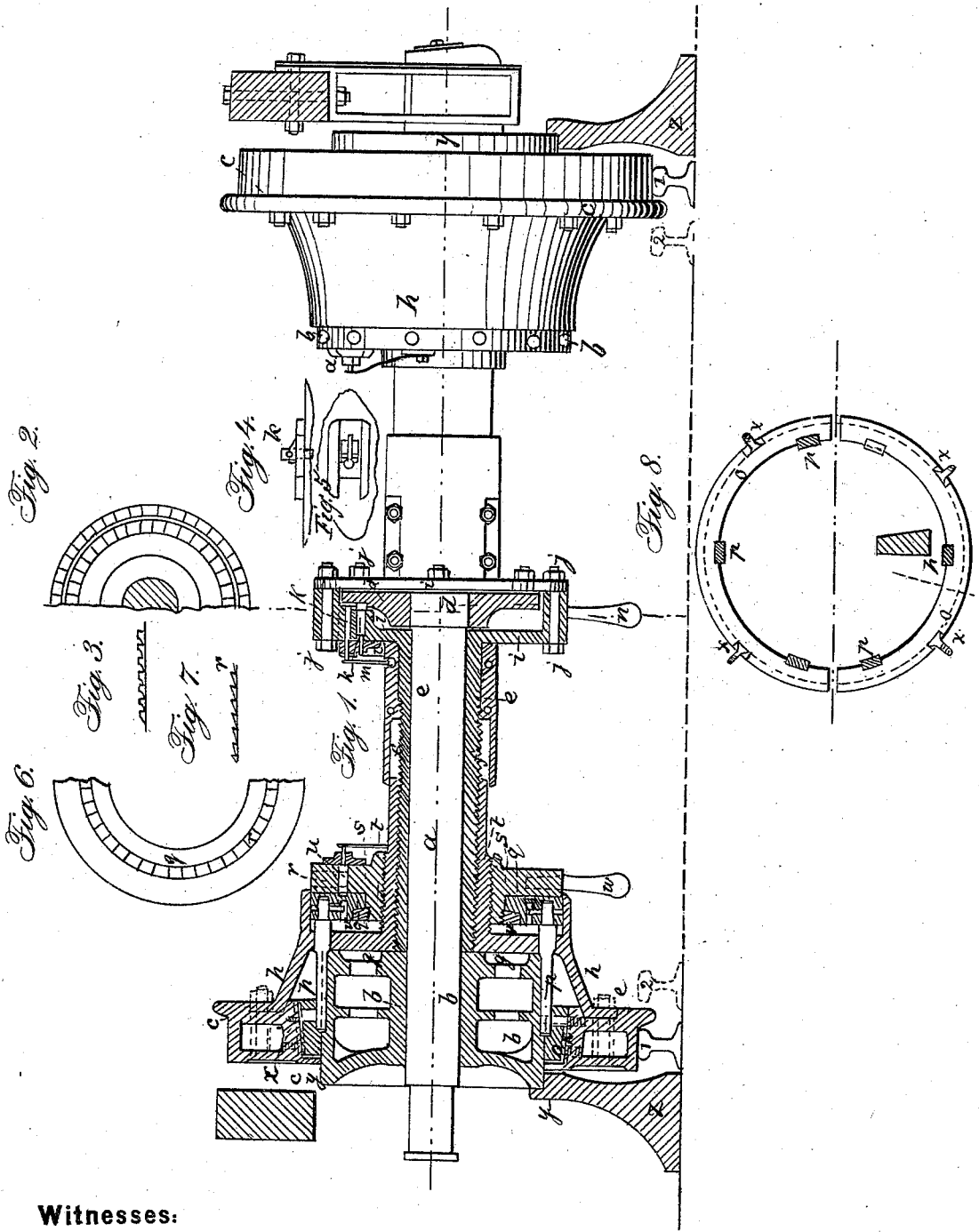
Witnesses:
Gustav Briggs Jr.
Benj. P. Chandler
Inventor:
Otis Tufts

UNITED STATES PATENT OFFICE.

OTIS TUFTS, OF BOSTON, MASSACHUSETTS.

IMPROVEMENT IN RAILROAD WHEELS AND AXLES TO RUN ON DIFFERENT-GAGED TRACKS.

Specification forming part of Letters Patent No. 33,407, dated October 1, 1861.

*To all whom it may concern:*

Be it known that I, OTIS TUFTS, mechanical engineer, of Boston, county of Suffolk, and State of Massachusetts, have invented a new and useful improvement by constructing the wheels of railroad-cars in such manner as to admit of being easily adjusted to tracks of different widths of gage; and the following description, with the accompanying drawings, forms a full, clear, and exact specification thereof.

To construct railroad-car wheels for the purpose of being adjusted to run upon tracks differing in widths of gage, it is obviously impracticable to make the adjustment by sliding or otherwise moving the wheels directly upon the axle itself. It would be difficult to adjust the wheels with the weight even of an empty car upon them, and nearly or quite impossible when the car was loaded. In such case it would be necessary, in order to relieve the wheels from the load, to run the axle itself upon an independent section of rail or support; but it will be seen that the mere axle will be too small a wheel or roll on which to move so heavy a body upon the above-mentioned support after leaving the rail. Besides that, it would be very hard to overcome the inertia and start the loaded car on so small a roll. No known mechanical device is practically adapted to the purpose of tightening or firmly fastening the wheel on the axle after adjustment. To slide the tire directly upon the rim of the wheel has many objections, although not the same as in the former case. To divide the wheel for the purpose of adjustment so near its circumference, it would be necessary to make use of a wrought-iron tire, which is not the best material for the purpose and at the same time is very costly; and as to the machinery that would be necessarily employed for the purpose of effecting the adjustment and for fastening the tire after the adjustment it would be costly and very cumbersome.

So far as evidence goes, it is found that the thought that has been bestowed upon this subject has been in the direction of one or the other above methods. By examination I have found the objections to them practically insurmountable, and by further application I have devised the method herein described.

It is obviously necessary in constructing cars adapted to different widths of gage that the axle should be made of the length required for the broadest track. The only variations in my axles from those in ordinary use is that they are lathe-finished and cylindrical in form between the wheel-hubs. On either end of the axle where the wheel is usually fixed I introduce cylindrical wheels without guide-flanges and of a diameter about or a little more than half that of the principal wheels and something more than twice the breadth of rim of the wheels usually employed. These are closely fitted and fastened to the axle. The rim on the outer side of the above central division of the wheel is made to project some two inches by the outer face of the rim of the larger division of the wheels, this projection is for the purpose of receiving or taking the weight of the car onto short rails which are set a little outside of the line of the rails composing the broadest gage, and at the terminus or junctions of roads; also, it must project above the face of the principal rails sufficiently high to receive the above projecting rim in such manner as to prevent the car from either rising or settling when the wheels leave the track for the purpose of adjustment. The car being at rest and supported entirely by the projecting rim of the central division of the wheel and resting upon the above short rails, the outer division being relieved from the weight of the load is left free to be adjusted to any required point within the compass of its motion. The rims or outer divisions of the wheel on which the guide-flange is cast or otherwise attached are each to be simultaneously and to an equidistant extent drawn inward to the required position for the next narrowest gage, and so on, to any breadth required by being drawn still farther toward the center, and the operation is reversed and the outer divisions of the wheels are again pressed outward to the broadest gage by simply reversing the motion of the device employed for the purpose. At first sight it might be supposed that the desired object had been fully attained by the above improvements, and I am not aware that even as much as this has before been accomplished. Still I fully believe that if no further provision for security and durability of the parts were attained the enterprise would fail of success; but that which constitutes the great essential in this invention, when coupled with or incorporated into the parts already by words partially described, but to be more fully so, is that of binding, fastening, or firmly wedging the parts into a fixed and rigid mass, so that the heaviest loads or severest tests will not disturb the rigidness of the mass. This I accomplish by forcing a ring of metal, vulcanized rubber, or other suitable material powerfully into an annular space provided for the purpose between the outer surface of the central division of the wheel and the sliding division carrying the guide-flange, in a manner to be hereinafter described. This being once accomplished, the most ready and least expensive expedient has been secured for overcoming to a great extent the much-to-be-regretted error of introducing upon the same continent rails for carrying purposes differing in widths of gage.

Figure 1 is a transverse vertical view of my adjustable railroad wheel and axle, the left-hand half being shown in section and the right-hand half in elevation. $a$ represents the axle of a uniform cylindrical form. I make the wheel of two sections or divisions, viz: with an inner division or truck $b$, which is fast upon the axle, and an outer flanged division $c$, which is movable upon the inner division or truck in line of the axle. I make the outer division of such size and thickness that I am enabled to make it of cast metal with chilled rim, thus avoiding the necessity of using wrought-iron tires.

$d$ represents a collar or stop fixed in the middle of the axle, with a double ratchet cut on the side, as shown in Figs. 2 and 3. Upon the axle $a$, upon either side of the collar or stop $d$, is a circumscribing cylinder $e$, one having a right and the other a left handed screw-thread $f$ cut upon them. These screw-threads work into corresponding female threads in the supplementary hub $g$, which is attached to the outer division of the wheel by the conical disk $h$. Upon the inner ends of the cylinders $e$ are constructed the enlargements or box-wheels $i$, the two of which are so constructed as to form a cylindrical box or case around the ratcheted collar $d$, the two parts of the same being secured together by the screws $j$. Through the sides of this box or case project inwardly the two pawls $k$, adapted to act alternately in opposite directions coincidently with the ratchets on the stop-wheel $d$. These pawls are pressed to their action by the springs $l$ and $m$, and are alternately thrown out of action at pleasure by inclined planes or wedges, arranged as shown in detail views, Figs. 4 and 5.

The revolution of the cylinders is effected by application of manual power to the lever or "handspike" $n$, as shown in Fig. 1.

Having thus described the mechanical means by which I expand and contract the outer division upon the central division of my improved railroad-wheel rectilinearly to fit the different widths of gage, I proceed to explain and set forth a principle wholly peculiar to my present invention by which each such adjustment is performed by simple mechanical means, perfectly pack the joints between the outer and inner divisions of the wheel, and solidify the wheel for action. I do this by means of a circular segmental wedge $o$ introduced between the outer and inner divisions of the wheel. This segmental wedge is connected by means of a number of connecting-rods $p$ with the ring $q$, on the face of which is cut a ratchet $r$, as shown in detail views, Figs. 6 and 7.

$s$ is a ring or wheel upon the hub $g$, having a screw-thread at $t$. In the wheel $s$ is fixed the pawl $u$, which takes into the ratchet $r$. This is pressed to its action and released at pleasure by mechanism similar to that described in Figs. 4 and 5.

$v$ is a lip or flange secured to the ring-wheel $s$, to enable it to take perfect hold on the ring-wheel $q$ for drawing the wedge $o$.

The revolution of the ring-wheel $s$ is actuated manually by the lever $w$, (shown in Fig. 1.)

The operation of the above-described mechanism for packing and solidifying the joint between the two divisions of the wheel will clearly be perceived to be as follows, viz: When an adjustment is to be made from broad to narrow gage, or vice versa, the segmental wedge is withdrawn a little by action upon the lever $w$ through mechanism just described, and thus the friction and tension between the two divisions of the wheel is relieved and left perfectly free for the adjustment to be performed, which is effected by means of the rectilinear expansion or contraction of the outer division upon the inner division of the wheels by mechanism hereinbefore described. After the adjustment is performed the segmental wedge $o$ is forced out again and the joint between the outer and inner divisions of the wheel firmly packed and solidified and it is again ready for use.

$x$ are a series of keys or stops screwed upon the intrados of the outer division of the wheel and projecting a short distance into slots in the segmental wedge $o$ to prevent any rotary motion between the said outer division of the wheel and the circular wedge, while the same tendency to rotary motion between the wedge and the inner division of the wheel is prevented by the connecting-rods $p$, serving as keys, as is more particularly shown in detail view, Fig. 8.

I usually make the segmental wedge $o$ of metal; but it may be made of hard wood or other substances—as, for instance, vulcanized rubber, which being slightly elastic the conical form may be dispensed with and the tightening produced by the compression of the material, in which case the rods $p$ would be attached to a metallic follower to compress the rubber, the mechanism for operating remaining the same.

It will be observed that when the wheels are at their greatest expansion a portion of the inner division of the wheel $y$ still projects beyond the outer division, and between the broad and narrow gaged tracks there is a section of intermediate rails $z$ with flanges upon their upper and outer edges. This intermediate section of rails is made of the length of a car or a train of cars, and the rails are made of such height as to come up to the bottom edge of the projecting portion $y$ of the wheels or truck $b$, which being run on and supported upon them the weight is wholly relieved by the discontinuance of the common rail from the outer division of the wheel $c$ and the wheels are left wholly free for adjustment.

The portion of the truck $y$ which is supported on the intermediate section of rails $z$ is not necessarily of the same diameter as the central division of the wheel. It may even be made as a separate wheel, or the line of division may be fixed at a greater or less distance from the center of the wheel, as convenience and circumstances may admit.

Having thus described the mechanical details of my improvements, its general operation may be briefly recapitulated as follows: Suppose the car to be running upon the broad gage, the flanged division $c$ being upon the rails $l$. At change of gage the car in its continued course runs upon the intermediate rails $z$, which, as before stated, support the projecting portion $y$ of the central division of the wheel $b$, which relieving the load from the outer division $c$, the circular segmental wedge $o$ is withdrawn a little by the mechanism described, and the movement between the outer and inner divisions of the wheel left free and unobstructed. The wheels are then adjusted to the narrow gage, the rails of which are shown at 2, Fig. 1, when the segmental wedge is again firmly pressed or forged into the annular channel between the two divisions of the wheel, and thus the entire wheel is again solidified and ready for action.

Having thus described my improvements, what I claim as new, and desire to secure by Letters Patent, is—

1. Constructing railroad-car wheels in two divisions, substantially in the manner and for the purposes set forth.

2. The cylinder $e$, circumscribing the axle between the wheel-hubs, with right and left handed screw-threads and double-acting pawls, for the purposes set forth.

3. The circular wedge $o$ or its equivalent for tightening the outer division of the wheel upon the central division.

4. The mechanism herein described for actuating the ring or wedge $o$, substantially as specified.

OTIS TUFTS.

Witnesses:
LUTHER BRIGGS, Jr.,
BENJAMIN P. CHANDLER.